United States Patent Office 2,834,718
Patented May 13, 1958

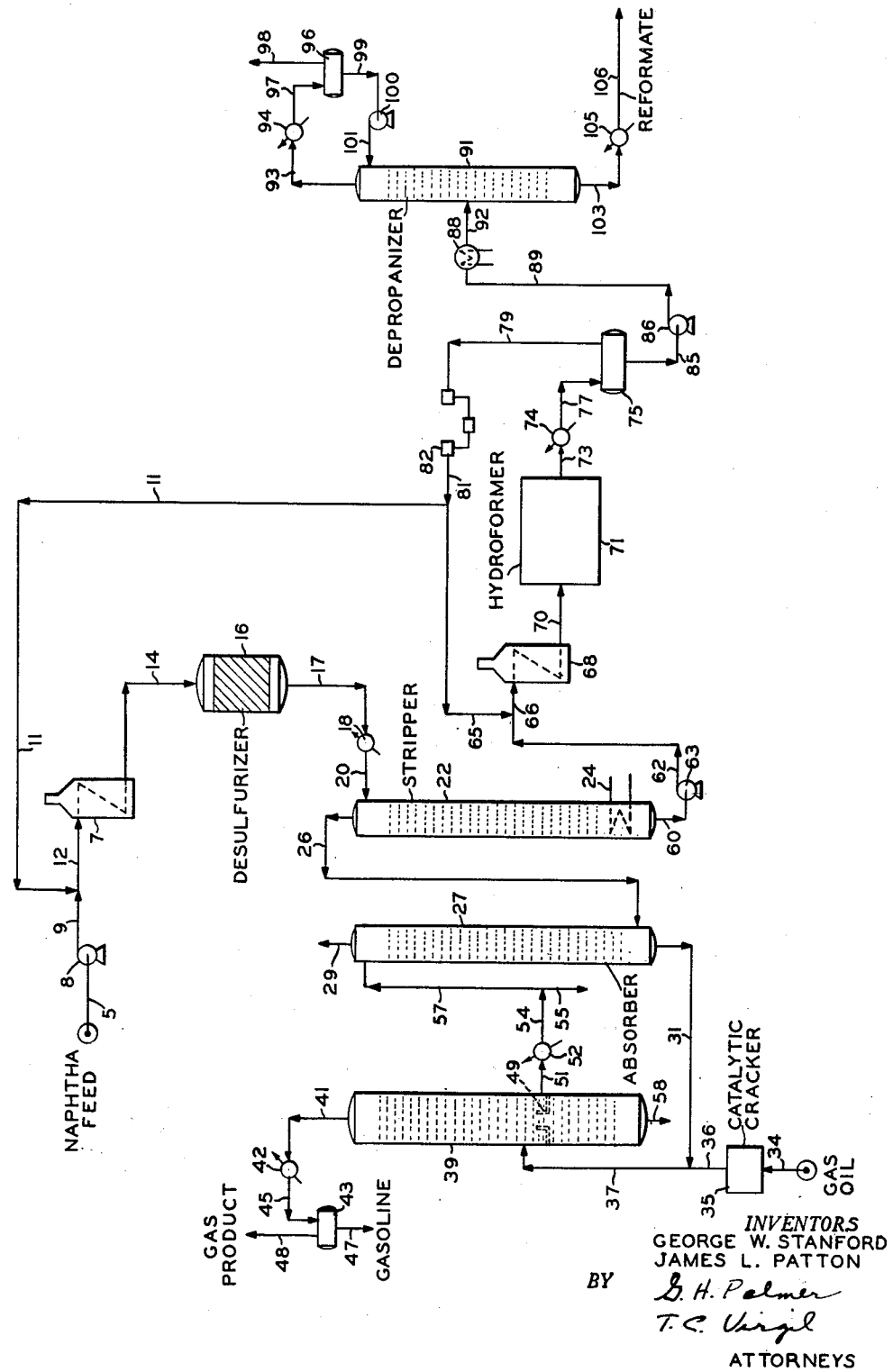

2,834,718

HYDROCARBON CONVERSION SYSTEM

George W. Stanford, Linden, and James L. Patton, Ramsey, N. J., assignors to The M. W. Kellogg Company, Jersey City, N. J., a corporation of Delaware Application October 15, 1954, Serial No. 462,426

6 Claims. (Cl. 196—50)

This invention relates to an improved method of reforming a light hydrocarbon oil, and more particularly, it pertains to a recovery system for a reforming process by which the feed material therefor is processed in an economical and efficient manner.

An object of this invention is to provide an improved hydroforming process.

Another object of this invention is to provide an improved hydroforming process in which the feed material is given a preliminary treatment for the removal of sulfur by means of an economical and efficient method.

Other objects and advantages of this invention are apparent from the following description and explanation thereof.

In accordance with the present invention, the reforming process is operated by the method which comprises contacting a light hydrocarbon oil with a reforming catalyst under suitable reforming conditions in a reforming zone to produce a reaction product including normally liquid product and normally gaseous product containing normally gaseous hydrocarbons, gasoline components, and hydrogen, separating the liquid product from the normally gaseous product, combining a portion of the separated gaseous product with a sulfur containing light hydrocarbon oil and subjecting the same to contact with a desulfurization catalyst under suitable desulfurization conditions to produce a desulfurized reaction product including desulfurized normally liquid material and normally gaseous product containing hydrogen sulfide, gasoline components, and normally gaseous hydrocarbons, cooling the desulfurized reaction product, passing the cooled desulfurized product to a stripping zone wherein the same is subjected to heat and thereby the normally gaseous product is removed substantially from the desulfurized liquid product and passing the stripped desulfurized liquid product to the reforming zone.

The present invention is concerned with a reforming process in which a light hydrocarbon oil is contacted with a suitable reforming catalyst which has hydrogenation-dehydrogenation properties, or it is capable of aromatizing hydrocarbons. The reforming catalyst is one which, for the purposes of this invention, will be termed as sulfur-sensitive by reason that for the intended purpose the light hydrocarbon oil to be reformed does not contain more than about 1.5% by weight of sulfur. It is to be understood that certain reforming materials such as the noble metals are more sensitive to sulfur than, for example, molybdenum trioxide catalyst, and consequently the amount of sulfur in the feed which can be tolerated for the large variety of catalytic materials useful for this purpose will vary appreciably. In the case of the noble metals, such as platinum, palladium, etc., it is preferred that the light hydrocarbon oil contain not more than about 0.03% by weight of sulfur, or still more preferred, a sulfur concentration of not more than 0.01% by weight. In the case of the low sulfur sensitive catalysts such as the oxides and/or sulfides of metal in groups IV, V, VI of the periodic table, the heteropoly acids, etc., it is preferred that the feed material contain not more than about 1.5% by weight of sulfur, and still more preferred not more than about 0.5% by weight of sulfur. The above catalytic elements are generally supported on carrier materials such as, for example, alumina, silica, silica-alumina, activated charcoal, zinc aluminate, pumice, magnesia, alumina-magnesia, etc. In general, the catalytic element comprises about 0.01% to about 50% by weight of the total catalyst. In the case of the noble metal catalysts, the catalytic element constitutes about 0.05 to about 10%, more usually about 0.1 to about 2% by weight, based on the total catalyst. Specific examples of the catalysts which can be used for this invention are platinum-alumina, molybdenum trioxide-alumina, chromia-alumina, tungsten sulfide-alumina, tungstomolybdic acid-alumina, silico-tungstic acid-alumina, etc.

The feed material to be used in the present invention is a light hydrocarbon oil, e. g., naphtha. This feed material can be a straight run fraction, a cracked stock, or a mixture of the two. In general, this feed material can have an initial boiling point of about 90 to about 300° F. an dan end point of about 325° to about 475° F. The sulfur concentration of the feed material is more than about 0.03% by weight or higher than 1.5% by weight, and it can be as high as about 2.5% or 3.0% by weight. Depending on the source of the material, the octane number thereof can vary from about at least 10 CFFR to about 75 CFFR clear; whereas the olefin concentration varies from about 0 to about 30 mol percent. In the case of the catalysts which are highly sensitive to sulfur, it is desirable that the feed material have an initial boiling point in the range of about 150 to about 300° F. and an end point lying within the range of about 325° to about 400° F. It is found that feed materials containing higher end points tend to deactivate the highly sensitive catalysts such as platinum catalyst at a greater rate than is desired. As previously indicated, these catalysts are also influenced adversely by sulfur, and it is preferred that the sulfur content of feed material is not greater than about 0.03% by weight.

The hydroforming reaction is conducted at a temperature of about 750° to about 1075° F., more usually, about 850° to 975° F. The reaction is carried out at a total pressure of about 25 to about 1000 p. s. i. g., more usually, about 50 to about 750 p. s. i. g. The quantity of oil which is processed relative to the catalyst present in the reaction zone is measured as the weight space velocity, that is, the pounds of oil charged to the reaction zone per hour per pound of catalyst which is present therein. Generally, the weight space velocity is about 0.05 to about 20, more usually, about 0.25 to about 10. The hydroforming reaction is conducted in the presence of added hydrogen. The conditions of the reaction are selected to produce a net production of hydrogen, consequently, the normally gaseous product material contains an appreciable amount of hydrogen which is recycled for further utilization in the process. The hydrogen containing gas or recycle gas contains about 50 to about 98% by volume of hydrogen. The hydrogen rate to the reforming process is about 500 to about 15,000 standard cubic feet, measured at 60° F. and 760 mm. Hg, per barrel of oil feed, abbreviated as s. c. f. b. More usually, the hydrogen rate is about 1500 to about 8500 s. c. f. b.

The feed material is subjected to a desulfurization treatment in the presence of a suitable desulfurization catalyst or a catalytic material which has the property of hydrogenating sulfur compounds to hydrogen sulfide. A large variety of catalytic materials can be used for this purpose including all of those which have been discussed hereinabove in connection with the reforming reaction. When the same type of catalyst is employed for the desulfurization reaction and the reforming reaction, the conditions of reaction are different to provide optimum desulfurization and optimum reforming. In addition to the catalytic materials enumerated above, another important class of catalysts which can be used for the desulfurization reaction is the combination of an oxide and/or sulfide of a left hand element of group VI of the periodic table and an oxide and/or sulfide of a group VIII metal having an atomic number not greater than 28. The combination of the two catalytic elements are commonly referred to as complexes, such as, for example, cobalt molybdate, nickel molybdate, nickel tungstate, etc. Such complexes can also be supported on the carrier materials which are enumerated above in connection with the reforming reaction. The complexes generally comprise about 0.1% to about 15% of an oxide and/or sulfide of a group VIII metal having an atomic number not greater than 28 and about 0.1 to 20% by weight of an oxide and/or sulfide of a left hand element of group VI of the periodic table.

The desulfurization reaction is conducted at a temperature of about 600 to about 875° F., more usually about 675 to about 800° F. The pressure of the desulfurization reaction varies from about 100 to about 1500 p. s. i. g., more usually about 100 to about 750 p. s. i. g. The quantity of oil which is treated under desulfurization conditions relative to the amount of catalyst which is in contact therewith is expressed as the weight space velocity, and in general, it is about 0.5 to about 25, more usually about 1 to about 10. The desulfurization reaction is effected in the presence of hydrogen. For the purpose of this invention, the hydrogen is supplied as a hydrogen containing gas from the reforming reaction, and in general, this hydrogen containing gas stream has about 50 to about 98% by volume of hydrogen, the remainder of the gas is constituted for the most part of normally gaseous hydrocarbons. In general, the only supply of hydrogen for the desulfurization reaction is supplied by means of the hydrogen which is produced on a net basis in the reforming reaction, and accordingly, this hydrogen rate is about 100 to about 1200, more usually about 300 to about 900, standard cubic feet of hydrogen measured at 760 mm. Hg, and 60° F. per barrel of oil feed, abbreviated as s. c. f. b. The hydrogen, in the presence of the catalytic material, serves to convert the sulfur compound to hydrogen sulfide and a hydrocarbon material.

By means of the hydrogenation of sulfur compounds to hydrogen sulfide and a hydrocarbon, the desulfurized product is comprised of normally liquid product and normally gaseous product containing hydrogen sulfide, gasoline components, and normally gaseous hydrocarbons. For the purpose of this specification and the appended claims, a gasoline component is a hydrocarbon containing at least three carbon atoms. The desulfurized product, after leaving the desulfurization zone, is cooled to a temperature at which a substantial part or all of the normally liquid product is condensed. Since the liquid product is in contact with hydrogen sulfide, a significant quantity of hydrogen sulfide remains dissolved in the liquid product and it becomes necessary to remove the same in order to obtain a product which is suitable for further treatment in the reforming zone. For this purpose, the total cooled desulfurized product may be passed to a stripping zone under essentially the pressure of the desulfurization reaction. The cooled desulfurized product is generally at a temperature of about 50 to about 250° F., more usually about 80 to about 140° F. While the preferred method of operation is to cool the desulfurized product at a pressure substantially equivalent to the desulfurization reaction pressure except for pressure drop in the lines, etc., due to friction, however, it should be understood that for the purposes of this invention it is also contemplated operating at any elevated pressure or atmospheric pressure, and, that in general, the cooled desulfurized product can be at a pressure of about 0 to about 1000 p. s. i. g. It is advantageous to cool the desulfurized reaction product at the pressure of the desulfurization reaction, because this eliminates the need for subsequent re-compression of the desulfurization gaseous product for treatment to recover gasoline components by absorption, and less energy is expended in transferring the liquid product to the reforming zone. The cooled desulfurized product enters the stripping zone where the normally gaseous product is separated therefrom to a substantial extent. This separation can be greatly accelerated by introducing the cooled desulfurized product to a stripping zone of reduced pressure, namely, one which is operated at a pressure which is about 25 to about 500 p. s. i. g., more usually about 50 to about 150 p. s. i. g., lower than the pressure of the cooled desulfurized product. Therefore, it can be seen that the cooled desulfurized reaction product is further desulfurized by passing the same to a stripping zone where dissolved hydrogen sulfide is removed from the condensed liquid product.

In the practice of this invention, a preliminary separation of condensed desulfurized liquid product from normally gaseous product is effected prior to subjecting the desulfurized liquid product to stripping action by heat. To effect this purpose, the total cooled desulfurized reaction product is passed to the top of the stripping zone such as, for example, a fractionation tower and thereby the main portion of the normally gaseous product is separated from the normally liquid product without further contact with the desulfurized liquid product in the stripping zone proper. In the stripping zone proper, the liquid product is subjected to heating conditions, with or without the use of a gasiform stripping agent at a temperature of about 250° F. to about 700° F., more usually about 350° F. to about 550° F. As a consequence, a substantial part or all of the remaining dissolved hydrogen sulfide in the liquid product is stripped therefrom and passes overhead as a separate stream or as part of the original normally gaseous product. The preliminary separation of gaseous product from condensed desulfurized liquid product can be obtained in a separate zone suited for this purpose.

The normally gaseous product which is separated from the desulfurized liquid product is further treated for the recovery of gasoline components. For this purpose, the normally gaseous product is contacted with a normally liquid hydrocarbon or petroleum fraction in an absorption zone at a temperature of about 50° F. to about 150° F., more usually about 80° F. to about 120° F., and a pressure of about 50 to about 500 p. s. i. g. The liquid absorbent can be any liquid material which has suitable solubility characteristics for gasoline components. However, in another aspect of this invention, it is contemplated using the cycle oil from a catalytic cracking operation for the purpose of absorbing the gasoline components. The absorbent liquid can be the light hydrocarbon oil feed to be desulfurized and/or the heavy fraction of the liquid product from the reformer which boils above the desired gasoline product.

The cycle oil to be used as the absorbing medium for the gasoline components has in general an initial boiling point of about 350° F. to about 500° F., and an end point of about 500° F. to about 800° F., and an API gravity of about 15 to 40° API. In the practice of this invention, a feed material or high boiling hydrocarbon oil for the catalytic cracking operation, such as, for example, gas oil, reduced crude, etc., is contacted with a suitable siliceous cracking catalyst, e. g., silica-alumina under suitable cracking conditions, such as, for example, a temperature of about 875° F. to about 1100° F., a pressure of about 0 to about 20 p. s. i. g., a catalyst oil ratio on a weight basis of about 1 to about 20, and a weight space velocity of about 0.1 to about 10. The product of the cracking operation is passed to a first separation zone wherein the gasoline and lighter product material is yielded overhead; a cycle oil for re-processing in the cracking operation as well as for use in the absorption of gasoline components from the normally gaseous product of the desulfurization operation is another fraction; and a heavy residual oil fraction, are yielded as products of the process. A portion of the cycle oil is passed to the absorption zone mentioned hereinabove, whereas the remaining portion may be recycled to the catalytic cracking operation or yielded as a product of the process. It can be seen that the absorbed gasoline components in the cycle oil are recovered in the separation zone of the catalytic cracking system, and thereby, the recovered gasoline components are yielded overhead along with the gasoline and lighter product materials. By this method of operation, the cycle oil of the cracking operation is utilized as the absorption medium for the combination process of desulfurizing and reforming.

In order to provide a fuller understanding of our invention, references will be had to the accompanying drawing which forms a part of this process and illustrates a specific embodiment.

Straight run naphtha having an initial boiling point of 228° F. and an end point of 360° F., a sulfur concentration of 0.04% by weight and an API gravity of 57.0° is fed by means of line 5 at the rate of 3600 barrels per day, and it is transported to a furnace 7 by means of a pump 8 and a line 9. A hydrogen containing gas having approximately 75% by volume of hydrogen and a molecular weight of 9.8 is supplied from line 11 to line 9 at the rate of 3934 pounds per hour. The combined stream of naphtha and hydrogen containing gas is passed to furnace 7 by means of line 12. The desulfurization feed of naphtha and hydrogen containing gas is discharged from furnace 7 by means of line 14 at a temperature of 750° F. and a pressure of 295 p. s. i. g. The total feed material passes from line 14 to the top of the desulfurization reactor 16 wherein there is maintained a fixed bed of cobalt-molybdate-alumina catalyst constituting about 3% cobalt oxide, 9% molybdenumtrioxide and the remainder alumina, on a weight basis. The quantity of oil feed being processed relative to the amount of catalyst which is present in the reactor 16, provide a weight space velocity of 6; the pressure in the reactor is maintained at about 290 p. s. i. g. The desulfurized product is discharged from the bottom of reactor 16 by means of line 17 and it is passed to a cooler 18 wherein the temperature is reduced to about 100° F. The desulfurized product is discharged from the cooler 18 by means of line 20, and it is passed to the top of a stripper 22. The pressure at the top of the stripper is maintained at about 245 p. s. i. g. and the temperature is about 100° F. The stripper is a suitable fractionating column provided with bubble cap trays; the bottom of the stripper is maintained at a temperature of about 500° F. and a pressure of about 245 p. s. i. g. The temperature at the bottom of the stripper is maintained by suitable means, e. g., reboiler, shown schematically as 24.

The normally gaseous product material along with the material which is stripped from the liquid product in the stripper is passed overhead by means of line 26. The normally gaseous product material enters the bottom of the absorber 27. Cycle oil having an API gravity of 22.8° is fed at the rate of 6870 barrels per day from the catalytic cracking operation to be discussed in greater detail below.

The temperature at the top of the absorber is about 110° F.; whereas the temperature in the bottom of the absorber is about 105° F. and the pressure therein is 245 p. s. i. g. The normally gaseous product material containing gasoline components flows in countercurrent relation to the downflowing cycle oil. The denuded gaseous material is discharged from the top of the absorber by means of line 29; whereas the cycle oil is yielded from the bottom of the absorber by means of line 31. The enriched cycle oil has an API gravity of 25.0° and it is discharged from the absorber at the rate of 7083 barrels per day. The enrichment of the cycle oil is to be compared with the loss in weight of the normally gaseous material, which originally has a molecular weight of 8.3 and it is supplied to the absorber at the rate of 3234 pounds per hour and ultimately the denuded gaseous material has a molecular weight of 4.6 and it is discharged from the top of the absorber by means of line 29 at the rate of 1617 pounds per hour.

Gas oil feed having an API gravity of 22.8° is supplied by means of line 31 to a catalytic cracking unit shown schematically as 35. The cracking unit 35 is operated at a temperature of 950° F. a pressure of 8 p. s. i. g., catalyst to oil ratio of 8 and a weight space velocity of 0.8. The cracked product is discharged from the cracker by means of line 36, and thence it is combined with the enriched cycle oil which is passed through line 31 and as a combined stream, the materials flow in line 37 to a feed fractionator 39. In the feed fractionator, the top temperature is maintained at 275° F. and the bottom temperature of 675° F., and a pressure of 7 p. s. i. g. Gasoline and lighter product material along with the gasoline components which is introduced into the feed by reason of the enriched cycle oil from absorber 27, are passed overhead from the fractionator 39 by means of line 41. The vaporous overhead product is cooled to a temperature of 110° F. by means of condenser 42, and thence it is passed to a separating drum 43 by means of line 45. The gasoline product is discharged from the bottom of separating drum 43 by means of line 47 whereas the normally gaseous product is discharged from the top of separating drum 43 by means of line 48. A cycle oil stream is withdrawn from the middle part of the fractionator 39 by means of donut tray 49 and line 51. The cycle oil is cooled to a temperature of 100° F. by means of condenser 52, and then it is passed to line 54. The cycle oil in line 54 divides such that the net production of cycle oil which is recycled to the catalytic cracking unit 35, is passed through line 55; whereas the cycle oil being used as the absorption medium in absorber 27 is passed through line 57. Residual oil product in fractionator 39 is discharged from the bottom thereof by means of line 58.

The stripped desulfurized liquid product produced in stripper 22 is discharged from the bottom thereof by means of line 60. The desulfurized liquid product has an API gravity of 57.8 and it is transported from line 60 to line 62 by means of pump 63 at the rate of 3681 barrels per day. The desulfurized liquid product is combined with recycle gas containing 75% by volume of hydrogen and which has a molecular weight of 9.8 by means of line 65 at the rate of 15,515 pounds per hour. The combined stream of desulfurized liquid product and hydrogen passes through line 66 before entering furnace 68; the reactant material is heated to a temperature of 920° F. in furnace 68, and then it is discharged therefrom by means of line 70. The heated reactant material is passed to a hydroformer shown schematically as 71. The hydroformer is operated at an average temperature of about 890° F., a pressure of about 300 p. s. i. g. and a weight space velocity of about 2. The reactant materials are contacted with a platinum catalyst comprising 0.6 weight percent supported on alumina. The reformed product is discharged from the hydroformer 71 to a line 73, and thence it is cooled by means of condenser 74 to a temperature of 100° F. The cooled reformed product is passed from condenser 74 to separating drum 75 by means of line 77. In the separating drum 75, the temperature is 100° F. and the pressure is 230 p. s. i. g. The normally gaseous product material is discharged overhead from the separating drum 75 by means of line 79. The total gaseous product is compressed to a higher pressure by means of compressor 80, and then it is discharged into line 81. The net production of normally gaseous product material is passed from line 81 to line 11, and it is utilized for desulfurization as aforedescribed. The normally gaseous product which is recycled to the hydroformer is passed from line 81 to line 65.

The reformed liquid product is discharged from the separating drum 65 by means of line 85, and then it is transported by means of pump 86 at the rate of 3248 barrels per day. This liquid reformed product passes from pump 86 to heating means 88 via line 89, and thence it passes from heater 88 to a depropanizer column 91 by means of line 92. The top temperature of the depropanizer column 91 is maintained at 125° F. and the bottom temperature of the depropanizer is at 450° F. and 280 p. s. i. g. The vaporous overhead product is passed through line 93, and then it is cooled by means of condenser 94 to a temperature of 100° F. The cooled overhead product is passed to a separating drum 96 by means of a line 97 and the pressure in the separating drum is maintained at 265 p. s. i. g. The gaseous product is discharged from separating drum 96 by means of line 98 at the rate of 1048 pounds per hour, and this product has a molecular weight of 36.4. The liquid product in separating drum 96 is discharged from the bottom thereof by means of line 99 and then it is recycled to the depropanizer column by means of pump 100 and line 101 at the rate of 1537 barrels per day. This recycled stream has a density of 4.14 pounds per gallon. The depropanized liquid product is discharged from the bottom of tower 91 by means of line 103 and then it is passed to cooler 105 wherein the temperature is reduced to 100° F. The depropanized liquid product is discharged from the cooler 105 by means of line 106 at the rate of 3096 barrels per day, and it has an API gravity of 50.3°.

Having thus provided a description of our invention along with specific examples thereof, it should be understood that no undue limitations or restrictions are to be imposed by reason thereof, but that the scope of the present invention is defined by the appended claims.

We claim:

1. A process which comprises contacting a light hydrocarbon oil with a reforming catalyst under suitable reforming conditions in a reforming zone to produce a reaction product including normally liquid product and a gaseous product containing hydrogen, separating the normally liquid product from the reaction product, combining a portion of the separated gaseous product with a sulfur containing light hydrocarbon oil feed and subjecting the same to contact with a desulfurization catalyst under suitable desulfurization reaction conditions to produce a desulfurized reaction product including desulfurized normally liquid product and gaseous product containing hydrogen sulfide, gasoline components and normally gaseous hydrocarbons, cooling the desulfurized reaction product to condense the normally liquid product containing dissolved hydrogen sulfide, separating the condensed liquid product from the gaseous product, passing the desulfurized liquid product to a stripping zone wherein the same is subjected to heat and thereby hydrogen sulfide is separated substantially therefrom, passing the gaseous product from the stripping zone to an absorption zone, contacting the gaseous product in the absorption zone with a hydrocarbon oil whereby gasoline components are absorbed from the gaseous product, said oil comprising at least a portion of the feed to the desulfurization reaction and passing the stripped desulfurized liquid product to the reforming zone.

2. The process of claim 1 which is further characerized by conducting the desulfurization reaction under an elevated pressure and cooling the desulfurized reaction product under a pressure which is substantially equivalent to the desulfurization reaction pressure.

3. A process which comprises contacting a light hydrocarbon oil containing not more than 0.03% by weight of sulfur with a reforming catalyst comprising a noble metal under suitable reforming conditions to produce a reaction product including normally liquid product and a gaseous product containing normally gaseous product components and gasoline components, separating the normally liquid product from the reaction product, combining a portion of the separated gaseous product with a light hydrocarbon oil feed containing more than about 0.03% by weight of sulfur and subjecting the same to contact with a desulfurization catalyst under suitable desulfurization reaction conditions to produce a desulfurized reaction product including desulfurized normally liquid product and gaseous product containing gasoline products, hydrogen sulfide and normally gaseous products, cooling the desulfurized gaseous product to condense the normally liquid product containing dissolved hydrogen sulfide, separating the condensed liquid product from the normally gaseous product, passing the desulfurized liquid product to a stripping zone where the same is subjected to heat and thereby the hydrogen sulfide is separated substantially therefrom, passing the gaseous product from the stripping zone to an absorption zone, contacting the gaseous product in the absorption zone with a hydrocarbon oil whereby gasoline components are absorbed from the gaseous product, said oil comprising at least a portion of the feed to the desulfurization reaction and passing the stripped desulfurized liquid product to the reforming reaction zone.

4. The process of claim 3 wherein cooling of the desulfurized reaction product is effected at an elevated pressure which is substantially equivalent to the pressure of the desulfurization reaction.

5. A process which comprises contacting a light hydrocarbon oil containing not more than about 1.5% by weight of sulfur with a low sulfur sensitive reforming catalyst under suitable reforming conditions in a reforming zone to produce a reaction product including normally liquid product and a gaseous product containing hydrogen, separating the gaseous product from the reaction product, combining a portion of the separated gaseous product with a light hydrocarbon oil feed containing not more than about 1.5% by weight of sulfur and subjecting the same to contact with a desulfurization catalyst under suitable desulfurization reaction conditions to produce a desulfurized reaction product including desulfurized normally liquid product and gaseous product containing hydrogen sulfide, gasoline components and normally gaseous product, cooling the desulfurized reaction product containing the normally liquid product containing the hydrogen sulfide, separating the condensed liquid product from the gaseous product, passing the desulfurized liquid product to a stripping zone where the same is subjected to heat and thereby the hydrogen sulfide is separated substantially therefrom passing the gaseous product from the stripping zone to an absorption zone, contacting the gaseous product in the absorption zone with a hydrocarbon oil whereby gasoline components are absorbed from the gaseous product, said oil comprising at least a portion of the feed to the desulfurization reaction and passing the desulfurized stripped liquid product to the reforming zone.

6. The process of claim 3 wherein a light hydrocarbon oil being fed to the reforming zone has an initial boiling point of about 150° to about 300° F. and an end point of about 325° to about 400° F.

References Cited in the file of this patent

UNITED STATES PATENTS

| | | |
|---|---|---|
| 2,375,573 | Meier | May 8, 1945 |
| 2,463,741 | Byrns | Mar. 8, 1949 |
| 2,479,110 | Haensel | Aug. 16, 1949 |
| 2,580,478 | Stine | Jan. 1, 1952 |
| 2,671,754 | De Rosset et al. | Mar. 9, 1954 |
| 2,691,623 | Hartley | Oct. 12, 1954 |
| 2,726,193 | Docksey et al. | Dec. 6, 1955 |